United States Patent Office 3,319,157
Patented May 9, 1967

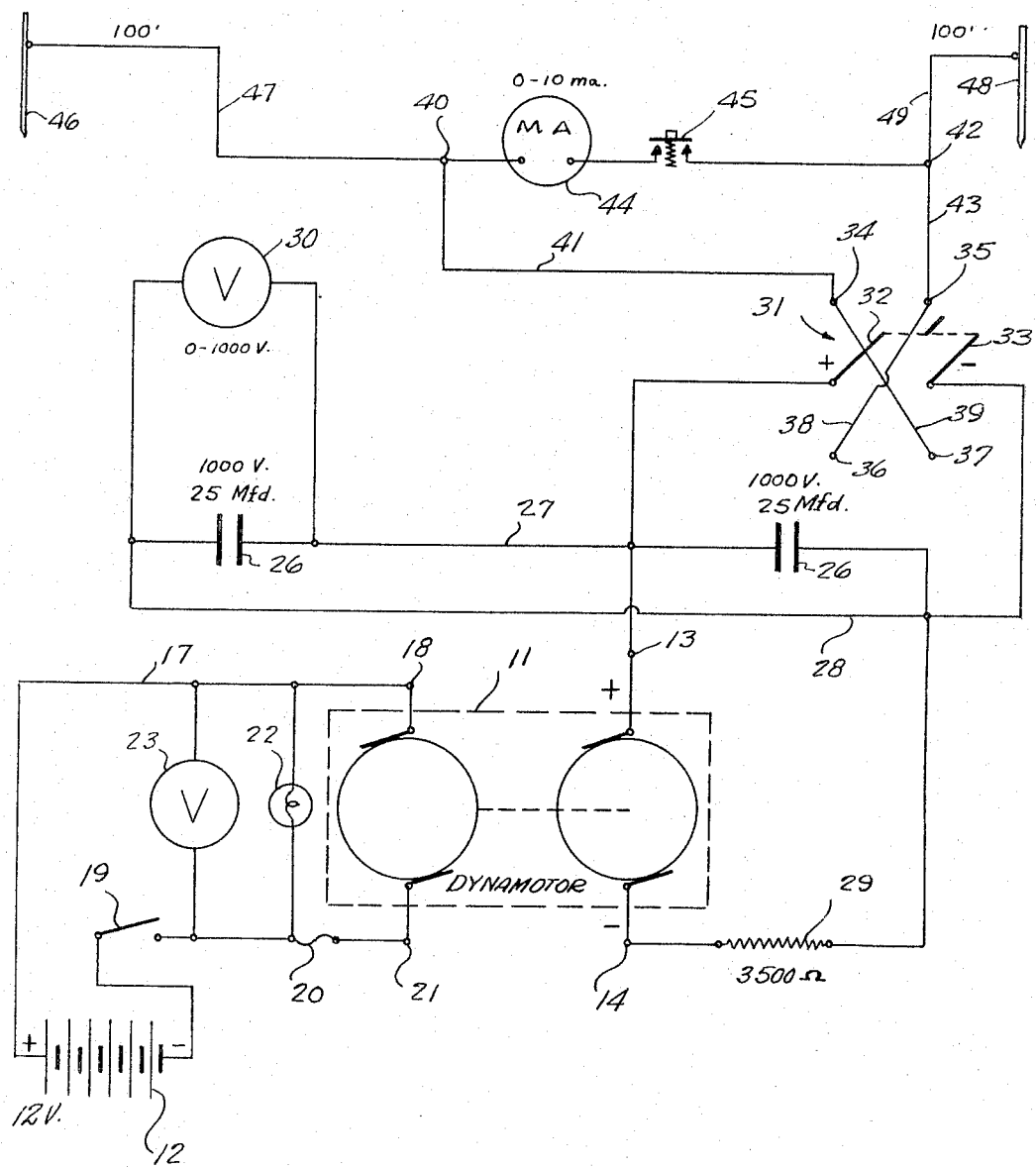

3,319,157
METHOD FOR DETECTING UNDERGROUND WATER BY DISCHARGING CAPACITOR MEANS THROUGH THE EARTH AND MEASURING THE RETAINED CHARGE
Archie W. York, Oklaunion, Tex., assignor of fifty-five percent to Les V. Wilson and five percent to Mary Caton, Wichita Falls, Tex., and forty percent to J. A. Storey, Vernon, Tex.
Filed Apr. 2, 1965, Ser. No. 445,069
1 Claim. (Cl. 324—1)

This invention relates to geophysical prospecting, and more particularly to a method and means for detecting underground water.

A main object of the invention is to provide a novel and improved system of geophysical prospecting intended primarily to detect underground water by the application of an electrical charge to spaced electrodes at the surface of the ground, the system employing relatively simple and inexpensive apparatus, being easy to put into practice, and providing reliable and accurate indications as to the location of underground bodies of water, the thickness of zones of water-bearing formations, and the probable yield of water from such formations.

A further object of the invention is to provide an improved apparatus for obtaining information regarding the presence and position of a body of underground water by electrical indications, the apparatus involving relatively inexpensive components, being easy to set up for operation, and providing indications which can be readily interpreted and which gives pertinent information regarding the characteristics of the detected body of water.

A still further object of the invention is to provide an improved technique for locating underground bodies of water by the use of simple electrical apparatus, the technique involving simple steps which can be easily carried out by relatively unskilled personnel, providing reliable and valuable information as to the presence of an underground body of water and its characteristics, and being such that tests can be rapidly made in various different locations, thereby enabling a body of water for a well to be quickly located with minimum expenditure of time and labor cost.

A still further object of the invention is to provide an improved apparatus for detecting the location of underground waters, obtaining the thickness of zones of water-bearing formations, and determining the probable yield of such formations, the apparatus being applied to the surface of the earth by means of a pair of detection electrodes and the determination being made with respect to the area located between said electrodes.

Further objects and advantages of the invention will become apparent from the following description and claims, and from the accompanying drawing, wherein the single figure is an electrical wiring diagram showing the circuit connections of an apparatus designed for use in accordance with the system of the present invention.

The prime purpose of the present invention is to provide a method and means for locating underground bodies of water and for obtaining information regarding such bodies, such as would be required in order to determine whether they are suitable for wells. Thus, the present invention contemplates locating bodies of water and determining information as to their depth and their potential producing capacity.

The technique of the present invention consists in general of applying a predetermined charge to a pair of electrodes which are spaced apart by a definite distance, the electrodes being embedded in the ground, observing the voltage across the electrodes during the charging period, which provides information with respect to the depth of a subjacent body of water, and thereafter discharging the electrodes through a suitably calibrated meter, which will provide information with respect to the producing capacity of the subjacent body of water.

The drawing diagrammatically illustrates a typical apparatus for carrying out the above-described general method. Thus, the apparatus illustrated comprises a conventional dynamotor 11 which is driven by a suitable battery 12, the dynamotor providing a relatively high voltage, for example, 1,000-volts D.C., at its output terminals 13 and 14. The positive terminal of the battery 12 is connected by a wire 17 to the positive input terminal 18 of the dynamotor, and the negative terminal of the battery 12 is connected through a manual control switch 19 and a fuse 20 to the remaining input terminal 21 of the dynamotor. Connected across the input circuit are an indicator lamp 22 and a volt meter 23. With the switch 19 closed, the volt meter 23 registers the voltage of battery 12, and the lamp 22 becomes energized.

A pair of heavy-duty capacitors 26, 26 are connected in parallel between a pair of conductors 27 and 28, the conductor 27 being connected to the output terminal 13 of the dynamotor, and the conductor 28 being connected through a resistor 29 to the output terminal 14 of said dynamotor. Resistor 29 preferably has a resistance value of the order of 3500 ohms. The capacitors 26 are of relatively high capacity, for example, each having a capacity of 25 microfarads with a voltage rating of 1,000-volts, corresponding to the output voltage of the dynamotor 11.

A voltmeter 30 is connected across the conductors 27 and 28, the voltmeter having an indicating range sufficiently high to register the maximum voltage which may appear across conductors 27 and 28, namely, a voltage at least equal to the output voltage of the dynamotor 11, which, in the typical apparatus illustrated is approximately 1,000-volts.

Designated generally at 31 is a double-pole, double-throw manually-operated reversing switch having respective poles 32 and 33 and the respective pairs of stationary contacts 34, 35 and 36, 37. Contact 35 is connected to contact 36 by first reversing conductor 38, and contact 34 is connected to contact 37 by a second reversing conductor 39. Switch terminal 34 is connected to a terminal 40 by a conductor 41 and switch terminal 35 is connected to another terminal 42 by a conductor 43. Connected in series between terminals 40 and 42 is a conventional high-resistance millammeter 44 and a normally open push button-operated switch 45. A first ground electrode 46 is connected to terminal 40 by a cable 47 and a second ground electrode 48 is connected to terminal 42 by another cable 49. The cables 47 and 49 are of definite lengths, for example, being each 100-feet long, so that when the electrodes 46 and 48 are inserted in the ground with the cables 47 and 49 extended and substantially in alignment, the electrodes 46 and 48 are separated by a predetermined length of intervening earth. The combined length of the cables 47 and 49 must be longer than the maximum depth of a suspected subjacent body of water to minimize errors arising from stray shunt paths between the electrodes 46 and 48.

In carrying out the method by means of the apparatus illustrated in the drawing, the switch 19 is first closed to energize the dynamotor 11, causing the capacitors 26, 26 to become charged up, the dynamotor 11 being operated for a sufficient length of time to insure that the capacitors are charged to their full capacity. This is done after the electrodes 46 and 48 have been inserted into the ground with the cables 47 and 49 extended in the manner above described.

The voltmeter 30 will register the voltage existing across the fully-charged capacitors 26, 26 which should be substantially the same as the output voltage of the dynamotor at the terminals 13 and 14. Switch 19 is then opened to de-energize the dynamotor. Switch 31 is then operated to move poles 32 and 33 into contact with the switch contacts 34 and 35 for a definite period, for example, 3-seconds, after which the poles 32 and 33 are returned to their open positions, shown in the drawing. This allows the charge on the capacitors 26, 26 to be applied to the ground through the electrodes 46 and 48 for the period of closure of switch 31. After switch 31 is opened, the charge will be retained in the ground to an extent depending upon the conditions therein existing between the electrodes 46 and 48. If there is a localized body of water in the region between the electrodes 46 and 48 a substantial amount of charge will be retained. Thus, if push-button switch 45 is now closed, connecting the milliammeter 44 across the electrodes through the cables 47 and 49 the milliammeter will register a substantial deflection and then its needle will slowly return toward zero, but will stop at a position on its scale corresponding to the amount of retained charge, which, in turn, corresponds to the size of the subjacent body of water and also to the potential producing capacity thereof. The milliammeter 44 is thus calibrated in terms of producing capacity, for example, may be calibrated to read 100-gallons of water per milliampere on the scale of meter 44.

During the transfer of charge from the capacitors 26, 26 to the ground through the electrodes 46, 48, a circuit is established through which current flows, and the voltage drop across the capacitors is registered on the voltmeter 30. The voltage drop across said capacitors 26, 26 will vary in accordance with the depth of the body of water existing in the ground between the electrodes 46 and 48, so that voltmeter 30 is employed to provide an indication of such depth. Said voltmeter may be suitably calibrated in feet so as to indicate the depth of the detected body of water. For example, if the voltage drop across voltmeter 30 changes from 1,000 volts (prior to the closure of switch 31) to approximately 40-volts when switch 31 is closed, this indicates that the detected body of water is approximately 40-feet below ground level. A relatively high reading on voltmeter 30 would be an indication that the soil is substantially dry and that there is no body of water within a practical depth between electrodes 46 and 48. If such is the case, when the push button-switch 45 is closed after the 3-second charging period, the needle of the meter 44 will return to a position close to zero, showing only a small retained charge and indicating the absence of any localized body of water at a practical depth in the soil between the electrodes 46 and 48.

Under conditions of relatively wet soil with moisture located near the surface, for example, in the case of saturated clay, or the like, the region between the elecrodes 46 and 48 will exhibit the properties of a resistance, rather than a capacitance. The electrical path between the electrodes 46 and 48 under these conditions will behave like a high resistance connected in series with a small capacity. When the small capacity is charged up by the closure of switch 31 for the 3-second period, and is thereafter discharged in the circuit containing meter 44 by the closure of the push button-switch 45, in the manner above-described, the discharge takes place through the high resistance of the saturated soil, whereby the meter 44 will show a substantially constant indication which does not appreciably decay. When such an indication is obtained, the area between the electrodes 46 and 48 is not suitable for a water well, since it does not contain any localized substantial body of water.

The results obtained by following the above procedure may be checked for reliability by reversing switch 31. Thus, to confirm the results obtained in a preceding test, the same procedure may be followed, except that the charge from the capacitors 26, 26 is transferred to the ground through the electrodes 46, 48 by engaging poles 32, 33 with the respective switch contacts 36, 37 for the 3-second charging period. This provides charging of the soil with reverse polarity, as compared with the preceding test. If the indications provided by the meter 30 and the milliammeter 44 are substantially the same as obtained in the preceding test, this confirms the results previously obtained.

As above-explained, during the transfer of charge from the capacitors 26, 26 to the ground through the electrodes 46, 48, under conditions where there is a localized body of water located at a practical depth in the region between the electrodes, a charging current flows, since the localized body of water creates a condition simulating the effect of a capacitor connected in circuit with a certain amount of resistance between the electrodes. The charge from the capacitors 26, 26 flows into the ground and charges up the aforesaid ground capacitor, and since there is only a definite amount of charge available, the voltage across the capacitors 26, 26 drops from the initial fully-charged voltage condition of 1,000-volts to a new voltage depending, to a substantial extent, upon the depth of the detected body of water, this voltage registering on the voltmeter 30 at the end of the charging period. As previously mentioned, the voltmeter 30 is calibrated in feet or similar units to indicate such depth, the calibration being made by careful previous tests in areas containing bodies of water at known depths.

Similarly, when the switch 45 is closed to discharge the ground capacitance through the milliammeter 44, as above-described, the reading on the milliammeter will stabilize at a value substantially corresponding to the static voltage across the ground capacitor. Since there is a definite amount of charge available, the static voltage of the ground capacitor will be a function of the size, and hence, the producing capacity of the underground body of water.

As in the case of the voltmeter 30, the milliammeter 44 is carefully calibrated by conducting tests in areas containing known bodies of water whose producing capacity has been previously determined by other means.

While a specific embodiment of an improved method and means for detecting underground bodies of water has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A method of locating an underground body of water in an area comprising charging a capacitor having a capacitance of at least 25 microfarads by applying thereto a D.C. voltage of the order of 1000 volts for a time period sufficient to charge the capacitor substantially to its full capacity, connecting the charger capacitor for a definite period of time of the order of 3 seconds to a pair of electrodes embedded in the ground and spaced apart by a distance greater than the maximum depth of a suspected subjacent body of water in the ground, whereby to discharge the capacitor and whereby the charge from the capacitor will be retained in the ground to an extent depending upon the moisture conditions existing therein between the electrodes, measuring the voltage drop across the capacitor continuously during its discharge to determine to what extent said voltage drop changes, whereby to indicate the depth of a suspected localized body of water in the ground between the electrodes, thereafter disconnecting the capacitor from the electrodes, and connecting a milliammeter between said electrodes to discharge the ground capacitance through said milliammeter and to indicate the static voltage across the electrodes immediately after the capacitor discharge, whereby to measure any retained charge between the electrodes, to thereby generally indicate the volume of a suspected localized subjacent body of water between the electrodes.

References Cited by the Examiner

UNITED STATES PATENTS

| | | | |
|---|---|---|---|
| 2,015,401 | 9/1935 | Jakosky | 324—1 |
| 2,153,636 | 4/1939 | Matsubara | 324—1 |
| 2,190,322 | 2/1940 | Potapenko | 324—1 |
| 2,190,324 | 2/1940 | Peterson | 324—1 |
| 2,291,596 | 7/1942 | White | 324—9 X |
| 2,786,021 | 3/1957 | Marsh | 324—29 X |

FOREIGN PATENTS

| | | |
|---|---|---|
| 880,026 | 6/1953 | Germany. |
| 403,601 | 12/1933 | Great Britain. |
| 851,512 | 10/1960 | Great Britain. |

OTHER REFERENCES

Vacquier et al.: Prospecting for Ground Water by Induced Electrical Polarization Geophysics, pp. 660–687 (pp. 677–682 relied on), vol. XXII, No. 3, July 1957.

WALTER L. CARLSON, *Primary Examiner.*

G. R. STRECKER, *Assistant Examiner.*